S. L. MEYERS.
COFFEE MAKER.
APPLICATION FILED JAN. 11, 1916.
1,217,044.
Patented Feb. 20, 1917.
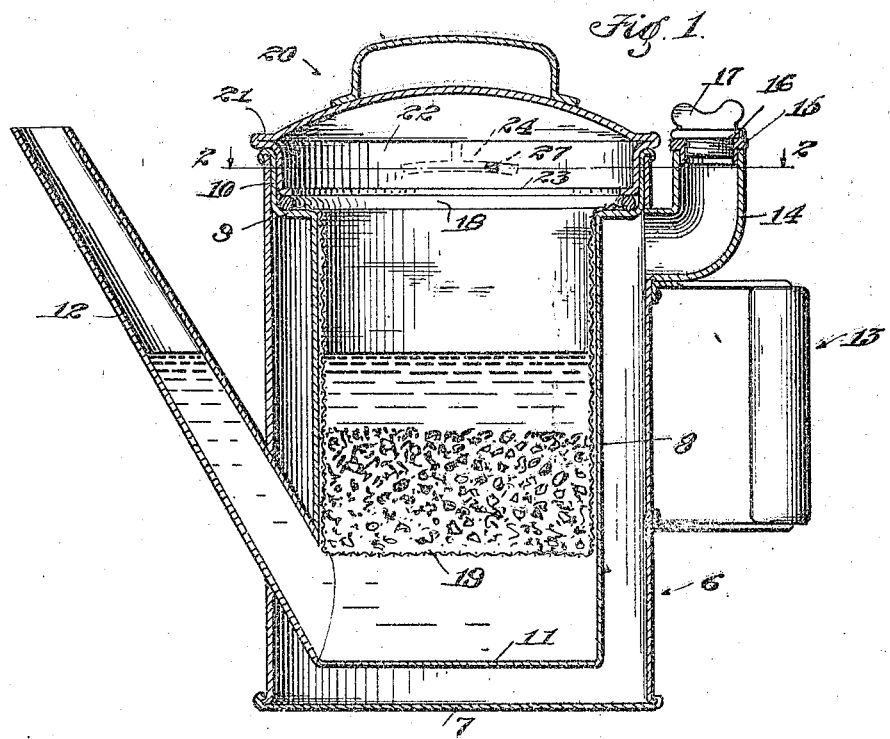
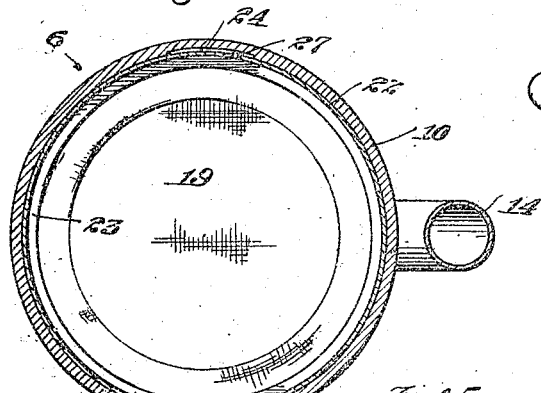
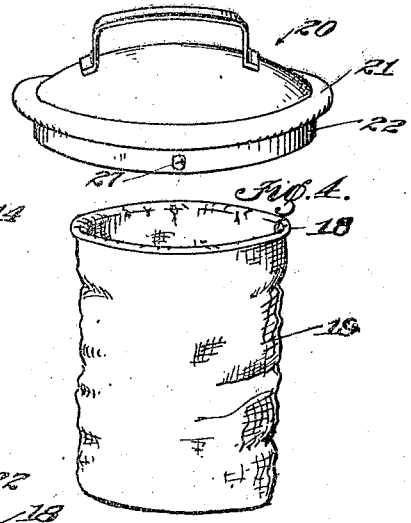
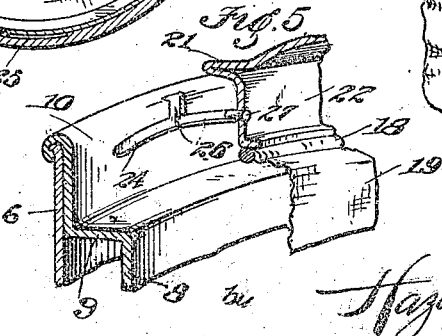
Inventor.
Samuel L. Meyers.
by Hazard Berry & Miller
Attys.

UNITED STATES PATENT OFFICE.

SAMUEL L. MEYERS, OF OCEANPARK, CALIFORNIA, ASSIGNOR TO SAM MEYERS & COMPANY, OF LOS ANGELES, CALIFORNIA, A CORPORATION OF CALIFORNIA.

COFFEE-MAKER.

1,217,044.  Specification of Letters Patent.  Patented Feb. 20, 1917.

Application filed January 11, 1916. Serial No. 71,448.

*To all whom it may concern:*

Be it known that I, SAMUEL L. MEYERS, a citizen of the United States, residing at Oceanpark, in the county of Los Angeles and State of California, have invented new and useful Improvements in Coffee-Makers, of which the following is a specification.

This invention relates to a coffee maker.

It is the object of this invention to provide a utensil which is especially adapted for domestic use in making coffee and similar beverages in which the coffee may be quickly made and readily kept hot within the utensil without boiling.

Another object is to provide a coffee maker which embodies the principles of the double boiler and which is provided with a pouring spout so arranged and connected to the inner compartment of the utensil that a slight inclination of the latter will effect a rapid and complete discharge of the coffee.

A further object is to provide the utensil with means for supporting a screen or sack for the reception of the ground coffee and having means whereby the lid of the utensil will securely clamp the sack in place and at the same time hold the cover against easy displacement.

The invention is illustrated in the accompanying drawings in which:

Figure 1 is a view of the utensil in vertical section and elevation.

Fig. 2 is a view in horizontal section on the line 2—2 of Fig. 1.

Fig. 3 is a perspective view of the cover.

Fig. 4 is a perspective view of the sack.

Fig. 5 is a detail in section and perspective showing the manner of fastening the cover and sack in place.

More specifically, 6 indicates the outer wall of the receptacle which is here shown as cylindrical in form and the lower end of which is covered with a bottom plate 7. Arranged within the compartment formed by the wall 6 is an inner receptacle here shown as having a cylindrical wall 8 of less diameter than the wall 6 and spaced therefrom in concentric relation thereto. The upper end of the wall 8 is turned outwardly to form a horizontal shoulder or flange 9 which connects with an annular upturned flange 10. The upper edge of the flange 10 is fastened to the upper edge of the wall 6 by a suitable seam.

The lower end of the wall 8 is closed by a bottom wall 11 which is spaced from the bottom plate 7 as particularly shown in Fig. 1. Connecting with the inner receptacle is a spout 12 which is preferably cylindrical in cross section and preferably straight throughout its length. The lower end of the spout 12 connects with the lower portion of the wall 8 so that the lower inner face of the spout will be arranged in continuation of the upper face of the wall 11. The spout 12 passes upwardly at an inclination to the outer wall 6 and terminates on a plane a short distance above the upper edge of the wall 6. By this construction, a slight inclination of the receptacle will effect a rapid and complete discharge of the liquid contents of the inner compartment through the spout 12.

The outer wall 6 is fitted with a handle 13 of any suitable construction, arranged diametrically opposite the spout 12, and opening to the space between the walls 6 and 8 above the handle 13 is a conduit 14 which is bent so that its upper end will be arranged on a horizontal plane substantially parallel with the upper edge of the wall 6. The upper end of the conduit 14 is fitted with an internally threaded collar 15 adapted to receive an externally threaded plug 16 on a cap 17.

The shoulder 9 forms a support for a ring 18 which carries a sack or screen 19 of such length that when the sack is positioned within the inner compartment its lower end will terminate in spaced relation to the wall 11 and substantially on a plane with the upper edge of the opening communicating with the spout 12.

The upper end of the inner compartment or receptacle is adapted to be closed by a cover 20 having a horizontally extending flange 21 on its marginal edge adapted to seat on the seamed upper edge of the wall 6 and flange 10. An annular flange 22 is formed on the under side of the cover which is adapted to snugly fit the inner face of the flange 10, and the lower edge of the flange 22 is turned inwardly to form a flange 23 which is adapted to seat upon and engage the ring 18 when the cover is disposed in its closed position.

As a means for fastening the cover against easy displacement and also adapt it as a means for clamping the ring 18, the inner face of the flange 10 is formed with a pair of horizontally extending grooves or channels 24 and 25 arranged diametrically opposite each other, which channels connect at their centers with vertically extending channels 26, as particularly shown in Fig. 5. The portions of the channels 24 and 25 extending on opposite sides of the vertical channels 26 are preferably inclined downwardly toward their outer ends at a slight angle. Formed on the outer face of the flange 22 on diametrically opposite sides thereof, are studs or pins 27 adapted to be introduced into the channels 26 and to engage the upper walls of the channels 24 and 25 when the cover is put in its closed position and turned slightly in either direction. The pins 27, in being thus moved into engagement with the inclined channels 24 and 25, coöperate with the latter, wedge fashion, to advance the cover into close and clamping engagement with the ring 18.

In the operation of the invention, the cover is removed and ground coffee is placed in the sack 19. Water, heated to a desired temperature, is then poured into the inner receptacle through the open upper end thereof, whereupon the cover is placed in position, as shown in Fig. 1. A quantity of hot water is then introduced into the chamber between the walls 6 and 8 through the conduit 14 and the latter closed by the cap 17. If the water added to the coffee, and placed in the outer compartment is of sufficiently high temperature, this is all that is required to prepare the coffee solution. However, it may be desirable to place the utensil over a small flame to maintain the desired temperature.

An important feature of the invention resides in arranging the spout 12 as before described, which will permit of a rapid and complete discharge of the coffee solution upon a slight inclination of the utensil.

What I claim is:

In a coffee utensil, an inner wall, a horizontal shoulder on the upper end thereof, a vertical flange on the outer edge of said shoulder, an outer wall connecting with said flange, encircling the inner wall in spaced relation thereto, a ring adapted to seat on the shoulder, a sack carried by said ring, a cover having a downwardly extending flange, and a pair of pins on diametrically opposite sides of said flange adapted to engage inclined channels formed on the inner wall of the first-named flange to hold the cover in place and at the same time clamp the ring on the shoulder.

In testimony whereof I have signed my name to this specification.

SAMUEL L. MEYERS.